United States Patent
Baur

(10) Patent No.: US 11,548,078 B2
(45) Date of Patent: Jan. 10, 2023

(54) DRILLING TOOL

(71) Applicant: WALTER AG, Tubingen (DE)

(72) Inventor: Florian Baur, Ammerbuch (DE)

(73) Assignee: Walter AG, Tubingen (DE)

( * ) Notice: Subject to any disclaimer, the term of this patent is extended or adjusted under 35 U.S.C. 154(b) by 53 days.

(21) Appl. No.: 17/047,583

(22) PCT Filed: Mar. 20, 2019

(86) PCT No.: PCT/EP2019/056932
§ 371 (c)(1),
(2) Date: Oct. 14, 2020

(87) PCT Pub. No.: WO2019/201538
PCT Pub. Date: Oct. 24, 2019

(65) Prior Publication Data
US 2021/0114119 A1    Apr. 22, 2021

(30) Foreign Application Priority Data
Apr. 17, 2018 (EP) .................................... 18167758

(51) Int. Cl.
*B23B 51/06* (2006.01)
*B23B 51/00* (2006.01)

(52) U.S. Cl.
CPC .......... *B23B 51/0011* (2022.01); *B23B 51/06* (2013.01); *B23B 2251/406* (2013.01); *B23B 2251/4011* (2022.01)

(58) Field of Classification Search
CPC ..... B23B 51/00; B23B 51/06; B23B 2251/40; B23B 2251/4011; B23B 2251/406
See application file for complete search history.

(56) References Cited

U.S. PATENT DOCUMENTS 1,104,989 A * 7/1914 Hanson ............... B23B 51/0486
408/59
2,912,887 A * 11/1959 Andreasson ............ B23B 51/06
408/230

(Continued)

FOREIGN PATENT DOCUMENTS

DE    102010021212 A1    11/2011
EP         0749795 A1    12/1996
(Continued)

*Primary Examiner* — Eric A. Gates
(74) *Attorney, Agent, or Firm* — Corinne R. Gorski

(57) ABSTRACT

A drilling tool includes a tool body having a center axis defining a longitudinal direction of the drilling tool. The tool body has an axially forward end and an axially rearward end, the distance in the longitudinal direction between the forward end and the rearward end defining a length of the drilling tool. At least two indexable cutting inserts are arranged at the axially forward end, a first indexable cutting insert being arranged at a radially inner position and a second indexable cutting insert being arranged at a radially outer position. The tool body includes a first flute portion extending axially rearward from the first indexable cutting insert and a second flute portion extending axially rearward from the second indexable cutting insert. The first flute portion transitions into the second flute portion at an axially forward transition area of the tool body, thereby forming only one flute of the tool.

17 Claims, 6 Drawing Sheets

(56) References Cited

U.S. PATENT DOCUMENTS

| | | | | |
|---|---|---|---|---|
| 3,040,605 A * | 6/1962 | Andreasson | ............ | B23B 51/06 |
| | | | | 408/59 |
| 3,045,513 A * | 7/1962 | Andreasson | ............ | B23B 51/06 |
| | | | | 408/230 |
| 3,824,026 A * | 7/1974 | Gaskins | .................. | B23B 51/02 |
| | | | | 408/230 |
| 4,149,821 A * | 4/1979 | Faber | ...................... | B23B 51/00 |
| | | | | 408/199 |
| 4,536,107 A * | 8/1985 | Sandy | .................... | B27G 15/00 |
| | | | | 408/230 |
| 5,174,691 A * | 12/1992 | Shepley | .................. | B23B 51/06 |
| | | | | 408/230 |
| 5,782,587 A * | 7/1998 | Basteck | .................. | B23B 51/00 |
| | | | | 408/229 |
| 7,004,691 B2 * | 2/2006 | Nomura | ................ | B23B 31/113 |
| | | | | 408/229 |

FOREIGN PATENT DOCUMENTS

| | | | |
|---|---|---|---|
| EP | 1419839 | A1 | 5/2004 |
| EP | 2140960 | A2 | 1/2010 |
| WO | 95/34397 | A1 | 12/1995 |

* cited by examiner

DRILLING TOOL

RELATED APPLICATION DATA

This application is a § 371 National Stage Application of PCT International Application No. PCT/EP2019/056932 filed Mar. 20, 2019 claiming priority to EP 18167758.4 filed Apr. 17, 2018.

TECHNICAL FIELD OF THE INVENTION

The present invention belongs to the technical field of metal cutting. More specifically the present invention belongs to the field of drilling tools used for metal cutting in machines such as computer numerical control, i.e. CNC, machines.

BACKGROUND OF THE INVENTION AND PRIOR ART

The drilling tool according to the present invention is particularly designed for chip forming machining of metallic work pieces and for drilling composite materials.

Such a drilling tool comprises a tool body having a center axis defining a longitudinal direction of the drilling tool, the tool body having an axially forward end and an axially rearward end, the distance in the longitudinal direction between the forward end and the rearward end defining a length of the drilling tool, and at least two indexable cutting inserts, which are arranged at the axially forward end, a first indexable cutting insert being arranged at a radially inner position and a second indexable cutting insert being arranged at a radially outer position, the tool body comprising a first flute portion extending axially rearward from the first indexable cutting insert, and a second flute portion extending axially rearward from the second indexable cutting insert.

Prior art drilling tools of this kind are suffering from a number of inherent problems which are difficult to overcome as will be discussed in the following.

For a cutting insert arranged at a radially inner position, i.e. close to the center, and with a given number of rotations per minute (rpm), the cutting speed is rather low due to its location at a small radius while the cutting speed is much higher for a cutting insert at a radially outer position, i.e. located at a larger radius. The different cutting parameters which are strongly varying from the radially inner cutting insert to the radially outer cutting insert cause the formation of different types and sizes of chips, which have different chip transportation requirements.

Further, the forces acting on the chips lead to a repeated deformation of chips, which in turn results in the generation of additional heat and unbalanced and varying cutting forces. This in turn causes an unstable behavior of the drilling tool during a cutting operation and may even cause breaking of the drilling tool, in particular of small diameter drilling tools which are less stable and may not withstand unbalanced and varying cutting forces. Even for drilling tools having a larger diameter, the unbalanced and varying cutting forces may result in vibrations and may cause an increase of wear.

SUMMARY OF THE INVENTION

A main object of the present invention is to provide a drilling tool having increased stability and torsional rigidity in order to obviate or at least minimize some or all of the afore-mentioned problems. A further object is to provide a drilling tool having improved chip transport characteristics. A still further object is to provide a drilling tool which can be manufactured in an economical way.

The first flute portion transitions into the second flute portion at an axially forward transition area of the tool body, thereby forming only one flute of the drilling tool.

In this way, a more stable and torsional rigid drilling tool is provided, especially in relation to conventional drilling tools having two separate flute portions, which run separately along the length of the drilling tool.

Furthermore, the chip transport of the drilling tool is improved. Surprisingly, it has been established that during drilling operations the larger chips produced by the radially outer cutting insert promote transportation of the smaller chips produced by the radially inner cutting insert in an advantageous way. By having said transition area at an axially forward location, the positive effect on the smaller chips is achieved close to the formation of these smaller chips.

According to one embodiment the transition area is located at an axial distance from the forward end amounting to no more than $L/3$.

According to another embodiment the transition area is located at an axial distance from the forward end amounting to no more than $L/10$.

In a further embodiment the first flute portion runs internally through the tool body forming a through hole from a front end surface to the second flute portion. In this way, the chips generated by the first, i.e. the radial inner, cutting insert are transported internally through the tool body to the second flute portion. Hereby, these chips do not come in contact with the hole wall being generated during this transport and the surface finish of the hole wall is improved.

According to another embodiment the first flute portion opens into a front end surface of the tool body via a first opening.

In a further embodiment the second flute portion opens into a peripheral surface of the tool body, which improves chip transport as well as enables production of the drilling tool in an economical manner.

In a further embodiment the second flute portion is open to the peripheral surface along the entire extent thereof in the longitudinal direction. This further improves chip transport and further simplifies production of the drilling tool.

According to another embodiment the first opening intersects a first plane being perpendicular to the center axis, thereby defining a first area, which is no more than 80% of the area of the front end surface. This relationship provides for a rigid drilling tool, while enabling good chip transport.

According to a further embodiment the first opening intersects a first plane being perpendicular to the center axis, thereby defining a first area, which is no more than 60% of the area of the front end surface. In this way, an even more rigid drilling tool is provided, while still securing an efficient chip transport.

In another embodiment a cross-section of the first flute portion in a second plane perpendicular to the center axis is smaller than a cross-section of the second flute portion in a third plane perpendicular to the center axis. In this way, the size of the respective flute portions is adapted to the different sizes and shapes of the chips generated by the different cutting inserts. At the same time, the rigidity of the tool body is improved.

According to another embodiment the second flute portion is helical. In this way chip transport is improved.

In a further embodiment the first flute portion as well as the second flute portion are helical. Thereby, a smooth transition between the first and second flute portions is established. At the same time, chip transport is improved.

According to another embodiment the pitch of the first flute portion is substantially the same as the pitch of the second flute portion, which further improves chip transport. Also, this enables production of the drilling tool in an economical way.

According to a further embodiment the tool body is a single-piece body made from one piece of material. Firstly, this enables production of the drilling tool in an economical way, since there is no need for connecting a plurality of different tool body parts. Secondly, a more rigid tool body is provided, without any connections between different tool body parts. Such connections are typically more prone to breakage at heavy loads.

In another embodiment said second flute portion has a radial depth, which is larger than a radius of the tool body along at least a first longitudinal segment of the second flute portion. In this way a larger second flute portion is provided, which enables transport of larger quantities of chips and decreases problems with chip congestion.

In a further embodiment the tool body comprises a coolant channel, which opens into the front end surface of the tool body via a coolant channel opening, which is adjacent to the first indexable cutting insert. In this way, coolant may be provided close to first indexable cutting insert, thereby improving performance of the drilling tool.

According to yet another embodiment the second flute portion has a partly circular cross-section, a first intersection of the second flute portion and the peripheral surface and a second intersection of the second flute portion and the peripheral surface together forming an angle of no more than 80°. In other words, the second flute portion is somewhat closed, i.e. in cross-section the second flute portion is larger or wider towards the center of the drilling tool, than at its intersection with the peripheral surface. In this way, the chips are better contained within the flute portion during chip transport, thereby improving surface quality of the hole wall being generated by the drilling tool. Also, a more rigid drilling tool is obtained in this way.

According to a further embodiment a cross-section of the first flute portion gradually increases from the front end surface to the second flute portion. In this way a more rigid drilling tool towards the front end surface is obtained.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Reference is made to FIG. 1-6, which show a drilling tool according to a first embodiment. Such a drilling tool is a device which is adapted for use in metal or composite cutting operations, primarily drilling operations, but the drilling tool can also be used for helical interpolation, boring, plunging and turning operations. The drilling tool is arranged to be mounted or connected to a machine tool (not shown), such as a CNC machine, either directly or indirectly by one or more tool holders, to a tool spindle of the machine tool.

Figure 1:
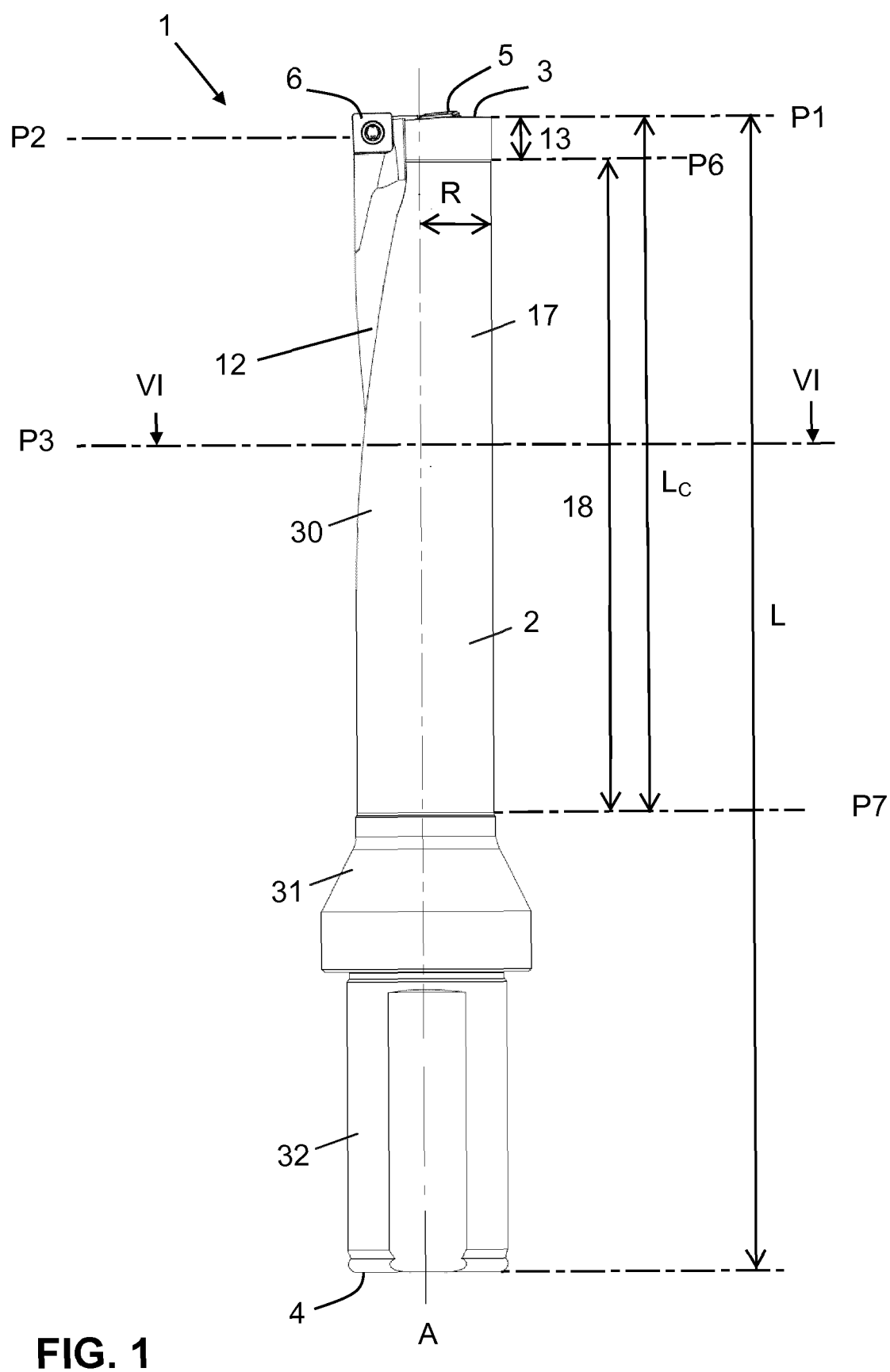
FIG. 1 is a side view of a drilling tool according to a first embodiment of the present invention.

As can be seen from FIGS. 1-6, the drilling tool 1 comprises a tool body 2, which has a center axis A defining a longitudinal direction of the drilling tool 1. The drilling tool 1 is rotatable around the center axis A in a rotational direction 23, see FIG. 3. The tool body 2 has an axially forward end 3 and an axially rearward end 4. The distance in the longitudinal direction between the forward end 3 and the rearward end 4 defines a total length L of the drilling tool 1. Rearward from the forward end 3, a peripheral surface 17 extends on a front cylindrical portion 30 of the tool body. Said front cylindrical portion, i.e. having shank-like form, ends in a collar portion 31 having generally conical shape, which in turn transforms into a rear mounting portion 32, which is arranged to be mounted in a machine tool (not shown). The mounting portion 32 has a generally cylindrical form. The front cylindrical portion 30 extends between a first plane P1, which is perpendicular to the center axis A, and a seventh plane P7, which is parallel with the plane P1, but is located axially behind or lower than the first plane P1, as illustrated in FIG. 1. Thus, the seventh plane P7 indicates the transition between the front cylindrical portion 30 and the collar portion 31. The axial distance between the first plane P1 and the seventh plane P7 defines a maximum cutting length $L_C$ of the drilling tool, i.e. how deep a hole can be machined with the drilling tool without interfering with the collar portion 31.

The drilling tool further comprises at least two indexable cutting inserts 5, 6, which are arranged at the axially forward end. A first indexable cutting insert 5 is arranged at a radially inner position 7 and a second indexable cutting insert 6 is arranged at a radially outer position 8. More specifically, the tool body 2 comprises a radially inner pocket 24 for receiving the first indexable cutting insert 5 and a radially outer pocket 25 for receiving the second indexable cutting insert 6. The cutting inserts 5, 6 are secured in their respective pockets 24, 25 by means of a suitable clamping arrangement, such as by a screw 26.

The tool body 2 of the drilling tool is a single-piece body made from one piece of material, preferably tool steel, whereas the cutting inserts 5, 6 preferably are made of a hard metal such as cemented carbide.

The indexable cutting inserts 5,6 include a front insert end surface 35, 35', a back insert end surface 36, 36' and an insert side surface 37,37'. The cutting inserts 5,6 further include at least one cutting edge 38, 38' defined by the intersection of a front insert end surface 35, 35' and an insert side surface 37, 37'. The exact shape and cutting geometry of the first indexable cutting insert 5 and the second indexable cutting insert 6 may vary based on user requirements. The cutting inserts 5, 6 as illustrated have a generally rectangular or square configuration, but also other shapes, such as triangular inserts, are conceivable. Thus, in the illustrated embodiment the cutting inserts 5,6 have an insert side surface 37,37' defining four sides, which meet in four corner surface portions 39, 39'. These corner surface portions 39, 39' are curved. For each side, said cutting edge 38, 38' includes a straight cutting edge portion 40, 40', formed by the intersection of the front insert end surface 35, 35' and the insert side surface 37, 37'. Further, for each corner, said cutting edge 38, 38' includes one or more radiused or curved cutting edge portions 41, 41' formed by the intersection of the front insert end surface 35, 35' and the corner surface portions 39, 39' of the insert side surface 37, 37'.

In the illustrated embodiment the cutting inserts 5, 6 are indexable, i.e. rotatable around the axis defined by the screw 26, into four different active positions. Also other configurations, such as cutting inserts having two or three different active positions are conceivable.

Figure 2:
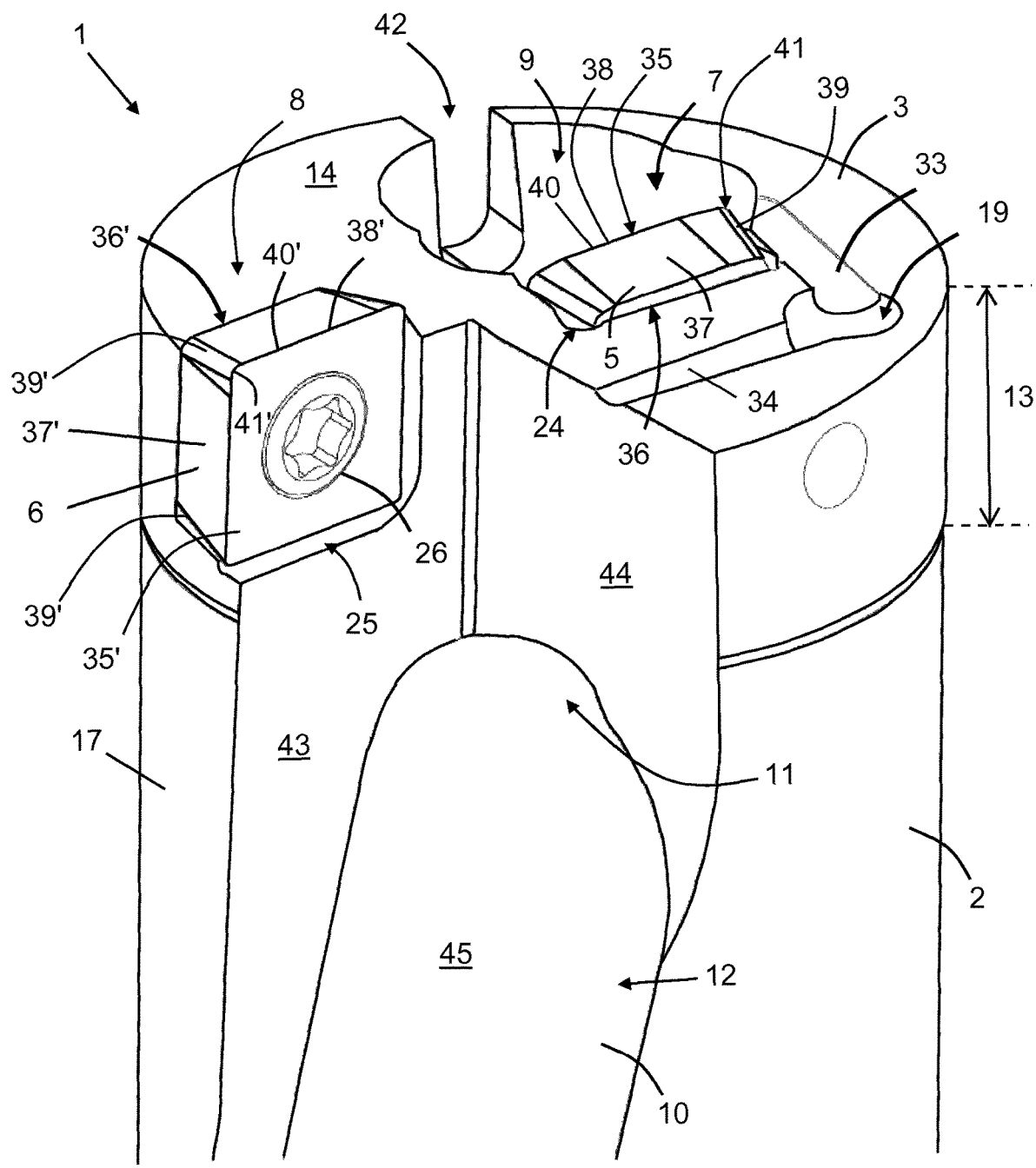
FIG. 2 is a perspective view of a forward part of the drilling tool of FIG. 1.
Figure 3:
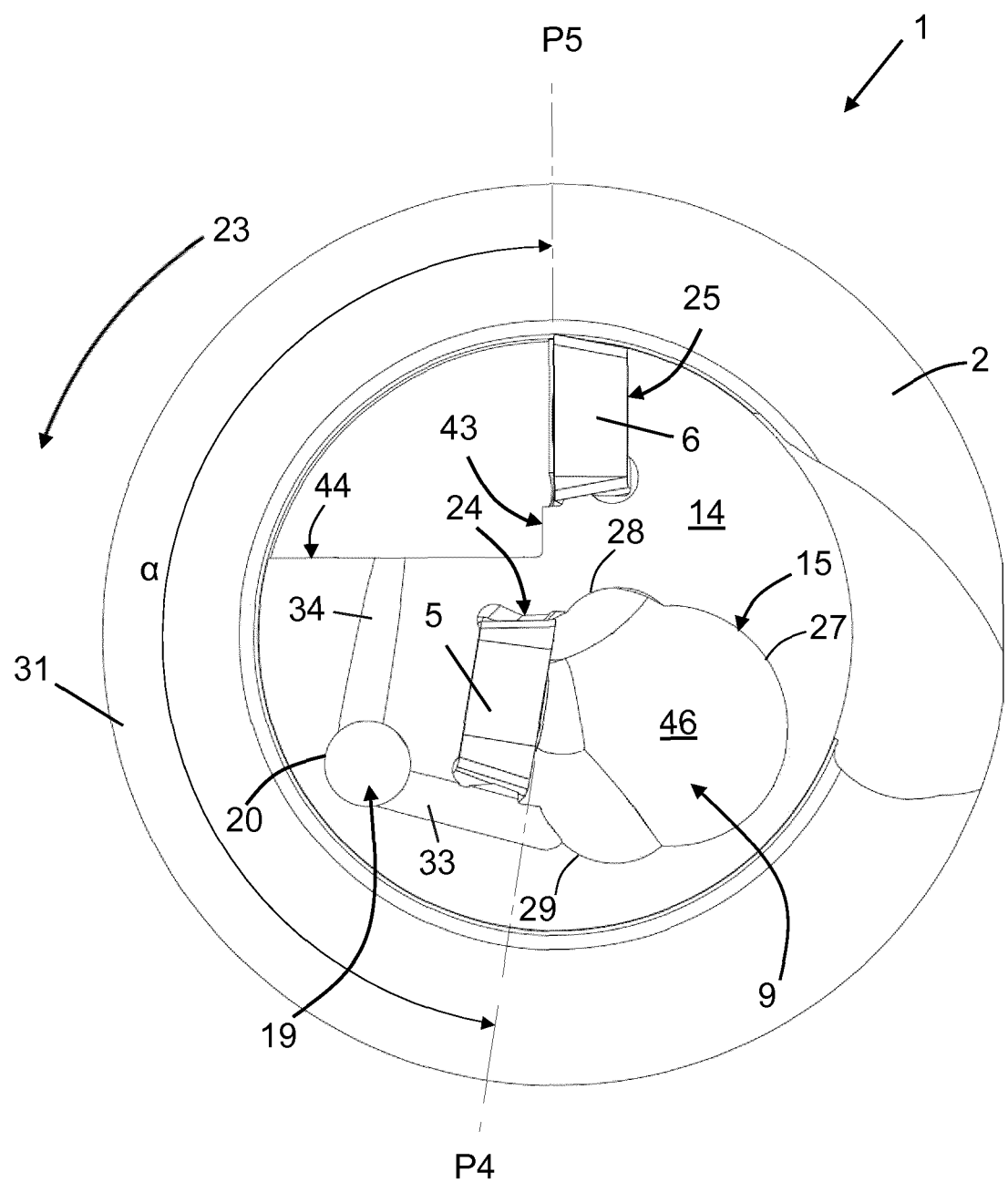
FIG. 3 is a top view of the drilling tool of FIG. 1.

Furthermore, based on user requirements the first indexable cutting insert 5 and the second indexable cutting insert 6 may be of identical or different configuration. In the illustrated embodiment the first, radially inner, indexable cutting insert 5 is different from the second, radially outer, indexable cutting insert 6. This is best illustrated in FIG. 2-3, where each of the four sides of the radially inner cutting insert 5 includes more surface portions, than corresponding four sides of the radially outer cutting insert 6. Accordingly, the cutting edge 38 of the radially inner cutting insert 5 includes more cutting edge portions, of different configuration, than the cutting edge 38' of the radially outer cutting insert 6.

The first, radially inner, indexable cutting insert 5 and the second, radially outer, indexable cutting insert 6 have radially overlapping working or active portions of their respective cutting edges 38, 38'. In other words, as apparent from FIG. 1, the forwardmost portions of the cutting edge 38, 38' of the cutting inserts 5,6, together cover a distance being at least equal to a radius R of the tool body, i.e. the radial distance from the center axis A to the periphery of the tool body 2. Thus, during drilling operation and rotation of the drilling tool the radially overlapping working or active portions of the cutting edges 38, 38' together machine the full diameter 2R of the drilling tool.

As apparent from FIG. 3 the first radially inner cutting insert 5 and the second radially outer cutting insert 6 are not mounted exactly 180° in relation to each other. Rather, in top view of the drilling tool, a fourth plane P4 being tangent to the front insert end surface 35 of the radially inner cutting insert 5 and parallel with the center axis A, and a fifth plane P5 being tangent to the front insert end surface 35' of the radially outer cutting insert 6 and parallel with the center axis A, together form an angle α amounting to 177°. Thus, the first radially inner cutting insert 5 and the second radially outer cutting insert 6 are slightly rotationally offset, i.e. offset in the rotational direction 23. Consequently, in top view of the drilling tool, the axially forwardmost portions of the cutting edges 38, 38' of the cutting inserts 5,6 do not form a straight line, but together these forwardmost portions of the cutting edges 38, 38' also form an angle α amounting to 177°.

The tool body 2 comprises a first flute portion 9 extending axially rearward from the first indexable cutting insert 5, and a second flute portion 10 extending axially rearward from the second indexable cutting insert 6. The first flute portion 9 transitions into the second flute portion 10 at an axially forward transition area 11 of the tool body 2, thereby forming only one flute 12 of the drilling tool 1. In one embodiment the transition area 11 is located at an axial distance 13 from the forward end 3 amounting to no more than L/3. In the illustrated embodiment in FIG. 1-6, the transition area 11 is located at an axial distance 13 from the forward end 3, which is smaller than L/10. As illustrated in FIG. 1, the axial distance 13 is the distance between a first plane P1, which is perpendicular to the center axis A, and a sixth plane P6, which is parallel with said first plane P1, but located axially behind or lower than the first plane P1.

As can be seen from FIG. 1-6 the first flute portion 9 runs internally through the tool body 2 forming a through hole from a front end surface 14 of the tool body to the second flute portion 10. As a result, the peripheral surface 17 is continuous and not interrupted by the first flute portion 9. The first flute portion 9 opens into the front end surface 14 of the tool body 2 via a first opening 15. In top view, the first opening 15 has a generally round shape. In the embodiment illustrated in FIG. 1-6, the first opening 15 includes a large arc 27, roughly having the form of a half-circle, which is connected to two smaller arcs 28, 29, which each is connected to the radially inner insert pocket 24. Thus, the generally round shape of the first opening 15 is formed by said three arcs 27, 28, 29 together with the radially inner insert pocket 24. As apparent from FIG. 3-4, the area covered by said first opening 15 is smaller than the area of the front end surface 14.

Figure 4:
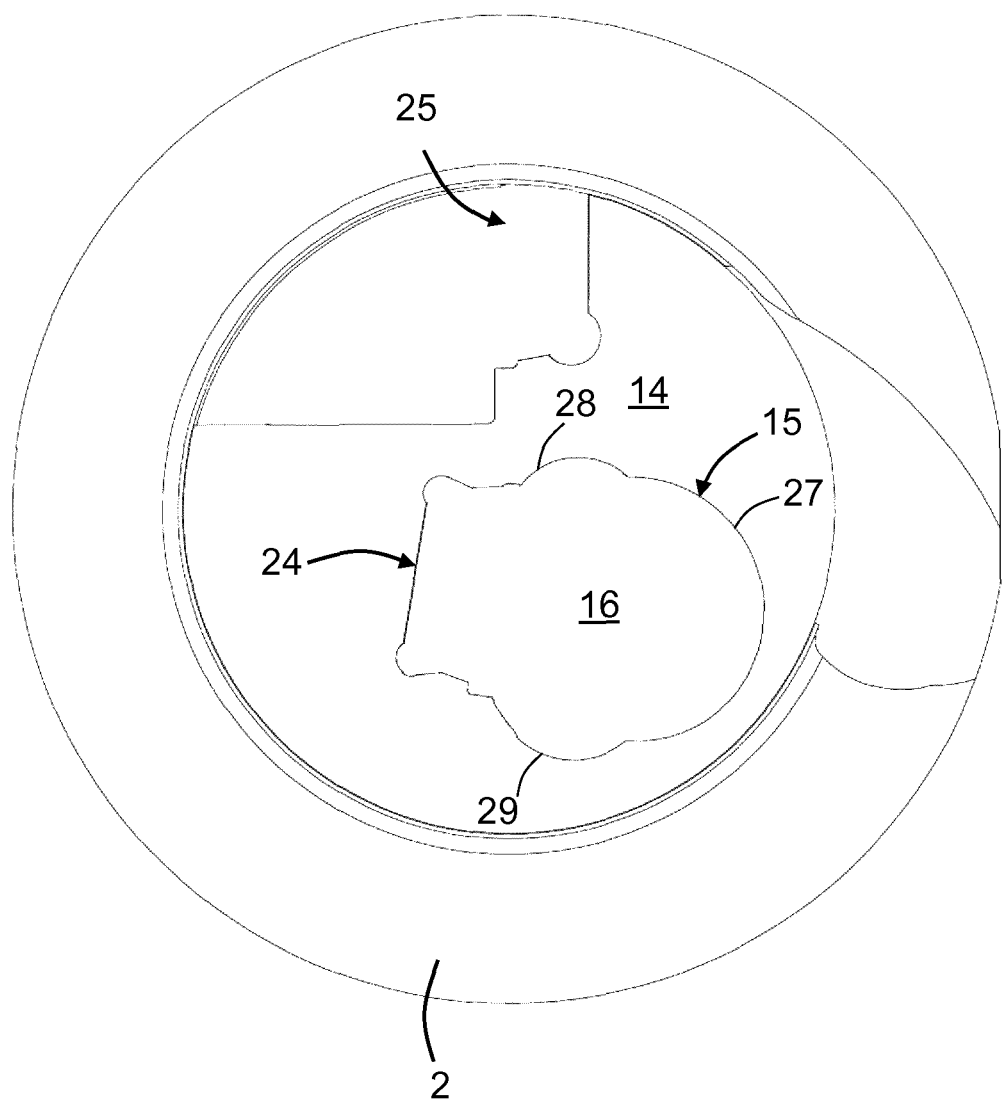
FIG. 4 is a top view corresponding to FIG. 3, but showing only the tool body of the drilling tool.

As can be seen in FIG. 1, according to this embodiment the front end surface 14 is perpendicular to the center axis A in a first plane P1. With reference to FIG. 4, in top view of only the tool body 2 of the drilling tool 1, the first opening 15 intersects the first plane P1, which is perpendicular to the center axis A, thereby defining a first area 16. In other words, according to the illustrated embodiment, the first opening 15 intersects the front end surface 14, thereby defining the area 16 being delimited by the radially inner insert pocket 24 and the three arcs 27, 28, 29. According to one embodiment, the first area 16 is no more than 80% of the area of the front end surface 14. In the embodiment of FIG. 1-6, the first area 16 is no more than 60% of the area of the front end surface 14.

Figure 5:
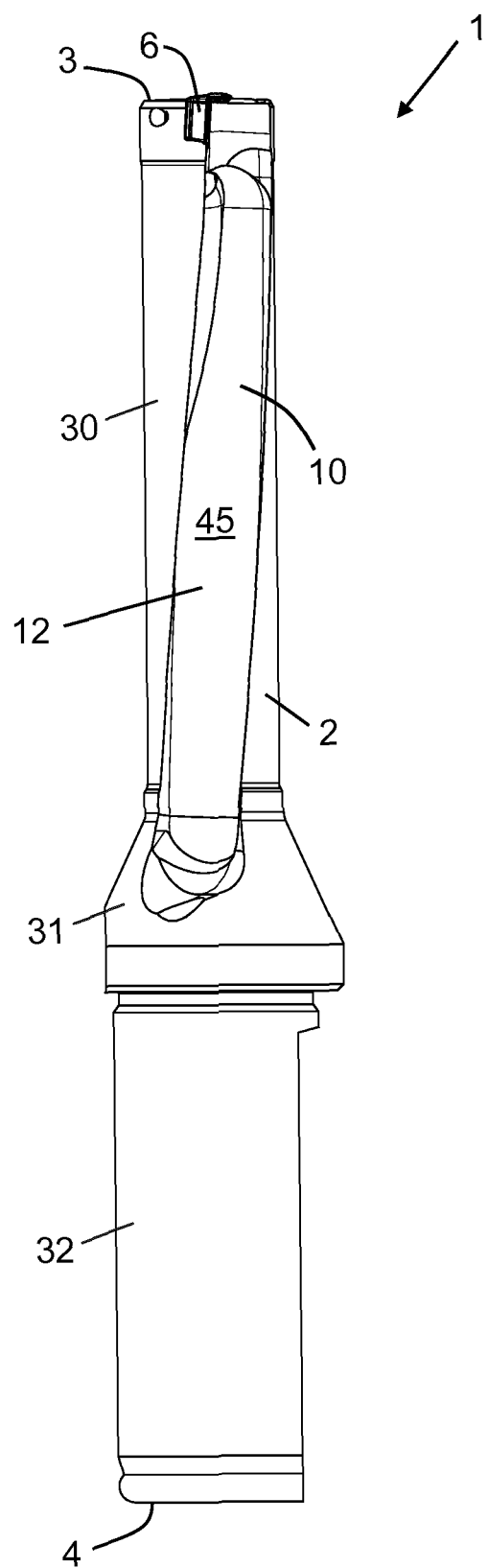
FIG. 5 is a side view of the drilling tool of FIG. 1, the drilling tool being rotated 90° around the drilling tool center axis as compared with FIG. 1.

Further, the second flute portion 10 opens into the peripheral surface 17 of the tool body 2. Preferably, and as illustrated in FIG. 5, the second flute portion 10 is open to the peripheral surface 17 along the entire extent thereof in the longitudinal direction. Thus, the second flute portion 10 is open to the peripheral surface 17 along the front cylindrical portion 30 of the tool body. As can be seen in FIG. 5 the second flute portion 10 continues from the front cylindrical portion 30 into the collar portion 31 and ends in the conical envelope surface of the collar portion 31.

In the embodiment illustrated in FIG. 1-6, the first flute portion 9 has a generally smaller cross-section than the cross-section of second flute portion 10. More specifically, the cross-section of the first flute portion 9 in a second plane P2 perpendicular to the center axis A is smaller than a cross-section of the second flute portion 10 in a third plane P3 perpendicular to the center axis A. The first plane P1 is tangent with the forward end 3 of the drilling tool, and is also tangent with the front end surface 14. The plane P2 is parallel with the plane P1, but is located axially behind or lower than the plane P1, as illustrated in FIG. 1. The plane P3 is parallel with the planes P1 and P2, but is located axially behind or lower than the plane P2, which is also apparent from FIG. 1.

Based on user requirements the first flute portion 9 may have varying or substantially constant cross-section along the axial extent of the first flute portion 9. In other words, the size of the first flute portion 9 may vary or be substantially constant along the axial extent thereof. In the embodiment illustrated in FIG. 1-6 the first flute portion 9 has a substantially constant cross-section. According to another embodiment, the cross-section of the first flute portion 9 increases gradually from the front end surface 14 to the second flute portion 10. In other words, the first flute portion 9 becomes gradually larger or has a generally conical configuration along its extent in the longitudinal direction from the front end surface 14 to the second flute portion 10.

Preferably, the first flute portion 9 as well as the second flute portion 10 are helical. In other words, the first flute portion 9 and the second flute portion 10 run in a helical manner in the longitudinal direction of the drilling tool. Further, the pitch of the first flute portion 9 is substantially the same as the pitch of the second flute portion 10, so as to form one continuous, helical flute 12 having one and the same pitch. As illustrated in FIG. 1-6 the second flute portion 10 comprises a curved inner surface 45. In the illustrated embodiment, for a more economical production of the drilling tool, the tool body 2 comprises a first flat surface 43 extending from the front end surface 14 and the radially outer insert pocket 25 to the curved inner surface 45. The first flat surface 43 intersects the peripheral surface 17 and is substantially parallel with the plane P5, i.e. substantially parallel with the front insert end surface 35' of the radially outer cutting insert 6. For a more economical production of the drilling tool, the tool body 2 further comprises a second flat surface 44 extending from the front end surface 14 to the curved inner surface 45. The second flat surface 44 intersects the peripheral surface 17 and is oriented in parallel with the center axis A and substantially at right angle with the first flat surface 43. Further, the first flute portion comprises a curved inner surface 46, which adjoins the arc 27 at the front end surface 14.

Figure 6:
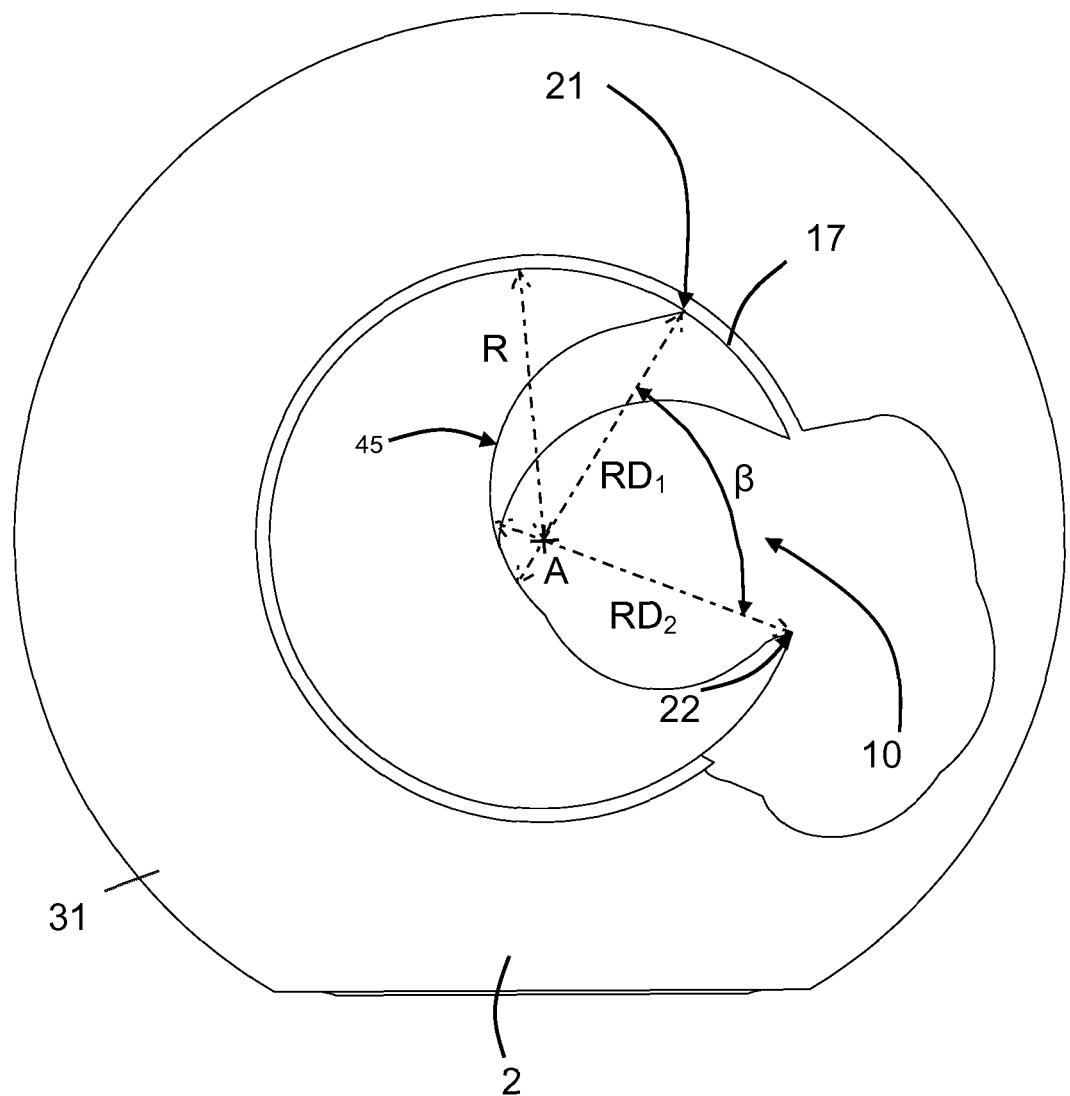
FIG. 6 is a cross-section along the line VI in FIG. 1.

As illustrated in FIG. 6, the second flute portion 10 has a radial depth $RD_1$ which is larger than a radius R of the tool body 2. In other words, a radial distance RD from an intersection between the second flute portion 10 and the peripheral surface 17 is larger than a radius of the tool body 2, i.e. the radial distance from the peripheral surface 17 to the center axis A. As illustrated in FIG. 6, a first intersection 21 is formed between the second flute portion 10, more specifically, the curved surface 45 thereof, and the peripheral surface 17. A first radial distance $RD_1$ larger than the radius R is formed between the first intersection 21 and the curved surface 45 of the second flute portion. Further, a second intersection 22 is formed between the second flute portion 10, more specifically, the curved surface 45 thereof, and the peripheral surface 17. A second radial distance $RD_2$ larger than the radius R is formed between the second intersection 22 and the curved surface 45 of the second flute portion 10. According to different embodiments the first radial distance $RD_1$ may be equal to or different from the second radial distance $RD_2$. The second flute portion 10 has a radial depth $RD_1$ which is larger than a radius R of the tool body 2, along at least a first longitudinal segment 18 of the second flute portion 10. In the embodiment illustrated in FIG. 1-6, the first longitudinal segment 18 extends the between the sixth plane P6 and the seventh plane P7. In other words, the first longitudinal segment 18 extends between the transition area 11, i.e. where the first flute portion 9 transitions into the second flute portion 10, and the transition between the front cylindrical portion 30 and the collar portion 31. Thus, the first longitudinal segment 18 extends a major part of the maximum cutting length $L_C$ of the drilling tool. According to another embodiment, the first longitudinal segment 18 is shorter, for example such that it extends from the sixth plane P6 but ends before, or above, the seventh plane P7.

Further, as can be seen in FIG. 2-3, the tool body 2 comprises a coolant channel 19, which opens into the front end surface 14 of the tool body 2 via a coolant channel opening 20, which is adjacent to the first indexable cutting insert 5. In other words, the coolant channel opening is located close to the first indexable cutting insert 5, but more distant in relation to the second indexable cutting insert 6. The coolant channel opening 20 is substantially circular. The tool body 2 further comprises a first groove 33, which is arranged in the front end surface 14 and connects the coolant channel with the first flute portion 9. Also, the tool body 2 comprises a second groove 34, which is arranged in the front end surface 14 and connects the coolant channel with the second flute portion 10. As best seen in FIG. 2, in this embodiment the tool body comprises an elongate recess 42, extending from the front end surface 14 in the longitudinal direction of the drilling tool and extending from the peripheral surface 17 to the first flute portion 9 in the radial direction. This recess 42 enables the insertion of a fastening tool, such as a screwdriver, from outside the drilling tool through this recess 42 into the first flute portion 9 reaching the screw 26 for fastening the radially inner cutting insert 5 in the radially inner insert pocket 24.

As illustrated more in detail in FIG. 6, the second flute portion 10 has a partly circular cross-section, i.e. a cross section of the curved surface 45 of the helical flute 12 will generate a curve being at least partly circular. Further, the first intersection 21 of the second flute portion 10 and the peripheral surface 17 and the second intersection 22 of the second flute portion 10 and the peripheral surface 17 together form an angle β of no more than 80°. Thus, the first radial distance $RD_1$ and the second radial distance $RD_2$ together enclose the angle β being no more than 80°. In other words, the second flute portion 10 is somewhat closed. As apparent from FIG. 6, the second flute portion 10 is larger or wider towards the center axis A of the drilling tool, than at its intersection with the peripheral surface.

The dimensions of the drilling tool as described above can be configured based on user requirements. For example, the total cutting length $L_C$ of the drilling tool 1 may be 30 mm or larger, but normally not larger than 540 mm. Examples of diameters 2R of the drilling tool include diameters from 10 mm to 60 mm. Further, the relationship between drilling tool diameter 2R and maximum cutting length $L_C$ is preferably configured such that $L_C/2R$ is at least 3 but not more than 9.

The invention is not limited to the embodiments disclosed, but may be varied and modified within the scope of the following claims.

For example, the flute of the drilling tool may be partly or completely coated with materials improving either the wear resistance and/or the chip transport. Furthermore, it is conceivable to arrange only the second flute portion to be helical, whereas the first flute portion has a more straight configuration.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A drilling tool comprising:
a tool body having a center axis defining a longitudinal direction of the drilling tool, the tool body having an axially forward end and an axially rearward end, a distance in the longitudinal direction between the forward end and the rearward end defining a length (L) of the drilling tool; and at least two indexable cutting inserts, which are arranged at the axially forward end, a first indexable cutting insert arranged at a radially inner position and a second indexable cutting insert arranged at a radially outer position, the tool body-including a first flute portion extending axially rearward from the first indexable cutting insert, and a second flute portion extending axially rearward from the second indexable cutting insert, wherein the first flute portion transitions into the second flute portion at an axially forward transition area of the tool body, thereby forming only one flute of the drilling tool, wherein the second flute portion has a radial depth, which is larger than a radius of the tool body along at least a first longitudinal segment of the second flute portion.

2. The drilling tool according to claim 1, wherein the transition area is located at an axial distance from the forward end amounting to no more than L/3.

3. The drilling tool according to claim 1, wherein the transition area is located at an axial distance from the forward end amounting to no more than L/10.

4. The drilling tool according to claim 1, wherein the first flute portion runs internally through the tool body forming a through hole from a front end surface to the second flute portion.

5. The drilling tool according claim 4, wherein a cross-section of the first flute portion gradually increases from the front end surface to the second flute portion.

6. The drilling tool according to claim 1, wherein the first flute portion opens into a front end surface of the tool body via a first opening.

7. The drilling tool according to claim 6, wherein the first opening intersects a first plane being perpendicular to the center axis, thereby defining a first area, which is no more than 80% of an area of the front end surface.

8. The drilling tool according to claim 1, wherein the second flute portion opens into a peripheral surface of the tool body.

9. The drilling tool according to claim 8, wherein the second flute portion is open to the peripheral surface along the entire extent thereof in the longitudinal direction.

10. The drilling tool according to claim 8, wherein the second flute portion has a partly circular cross-section, a first intersection of the second flute portion and the peripheral surface and a second intersection of the second flute portion and the peripheral surface together forming an angle of no more than 80°.

11. The drilling tool according to claim 1 wherein the first opening intersects a first plane being perpendicular to the center axis, thereby defining a first area, which is no more than 60% of the area of the front end surface.

12. The drilling tool according to claim 1 wherein a cross-section of the first flute portion in a second plane perpendicular to the center axis is smaller than a cross-section of the second flute portion in a third plane perpendicular to the center axis.

13. The drilling tool according to claim 1, wherein the second flute portion is helical.

14. The drilling tool according to claim 1, wherein the first flute portion as well as the second flute portion are helical.

15. The drilling tool according to claim 14, wherein a pitch of the first flute portion is substantially the same as a pitch of the second flute portion.

16. The drilling tool according to claim 1, wherein the tool body is a single-piece body made from one piece of material.

17. The drilling tool according to claim 1, wherein the tool body includes a coolant channel, which opens into a front end surface of the tool body via a coolant channel opening, which is adjacent to the first indexable cutting insert.

* * * * *